United States Patent
Zhu

(10) Patent No.: US 11,685,398 B2
(45) Date of Patent: Jun. 27, 2023

(54) LANE BASED ROUTING SYSTEM FOR AUTONOMOUS DRIVING VEHICLES

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 13 days.

(21) Appl. No.: 16/803,772

(22) Filed: Feb. 27, 2020

(65) Prior Publication Data
US 2021/0269056 A1 Sep. 2, 2021

(51) Int. Cl.
*B60W 60/00* (2020.01)
*G05D 1/02* (2020.01)

(52) U.S. Cl.
CPC ....... *B60W 60/0011* (2020.02); *G05D 1/0212* (2013.01); *B60W 2540/215* (2020.02); *B60W 2552/00* (2020.02); *B60W 2552/53* (2020.02); *B60W 2554/40* (2020.02); *G05D 2201/0213* (2013.01)

(58) Field of Classification Search
None
See application file for complete search history.

(56) References Cited

U.S. PATENT DOCUMENTS

| | | | | |
|---|---|---|---|---|
| 9,672,734 | B1* | 6/2017 | Ratnasingam | G08G 1/0968 |
| 2006/0184321 | A1* | 8/2006 | Kawakami | G01C 21/3658 |
| | | | | 701/411 |
| 2008/0033643 | A1* | 2/2008 | Shimizu | G01C 21/3461 |
| | | | | 701/533 |
| 2008/0046176 | A1* | 2/2008 | Jurgens | G06Q 30/0601 |
| | | | | 701/414 |
| 2012/0136567 | A1* | 5/2012 | Wang | G08G 1/096741 |
| | | | | 701/414 |
| 2014/0278052 | A1* | 9/2014 | Slavin | G08G 1/0129 |
| | | | | 701/400 |
| 2015/0345964 | A1 | 12/2015 | Oooka et al. | |
| 2016/0138924 | A1* | 5/2016 | An | G01C 21/34 |
| | | | | 701/25 |
| 2018/0089563 | A1 | 3/2018 | Redding et al. | |

(Continued)

FOREIGN PATENT DOCUMENTS

CN 100454357 C * 1/2009
CN 109000678 A * 12/2018

(Continued)

*Primary Examiner* — David P. Merlino
(74) *Attorney, Agent, or Firm* — Womble Bond Dickinson (US) LLP

(57) ABSTRACT

Embodiments disclose systems and methods to generate a lane-based reference line for an autonomous driving vehicle. In one embodiment, a system receives a request to route an autonomous driving vehicle (ADV) from a source location to a target location. In response to the request, the system identifies a set of road segments between the source location and the target location navigable by the ADV, where each of the road segments in the set includes one or more lane segments. The system identifies one or more lane paths corresponding to the set of road segments. The system determines an effective distance for each of the one or more lane paths. The system selects a lane path based on the determined effective distance. The system generates a lane-based reference line based on the selected lane path.

20 Claims, 13 Drawing Sheets

| Type/Labels | Effective Distance (Meters) |
|---|---|
| Straight | 0 |
| Left Turn | 80 |
| Right Turn | 20 |
| U-Turn | 100 |
| Change Lane | 50 |
| Traffic Light/Stop Sign | 100 (for each) |
| Stay in Left Lane | 5 (for each 100 meter) |
| Stay in Mid Lane | 0 (for each 100 meter) |
| Stay in Right Lane | 20 (for each 100 meter) |
| Merge Lane | 200 |
| Split Lane | -50 |
| Lane with a Solid Line | -3 (for each 100 meter) |
| Time Delay Cost | 60 (for each minute) |
| Distance Cost | Distance Length |
| ... | ... |

355

(56) References Cited

U.S. PATENT DOCUMENTS

| | | | |
|---|---|---|---|
| 2018/0186378 A1* | 7/2018 | Zhuang | G01C 21/3658 |
| 2018/0209801 A1* | 7/2018 | Stentz | G01C 21/3415 |
| 2018/0237018 A1* | 8/2018 | Goto | G01C 21/3658 |
| 2018/0261093 A1* | 9/2018 | Xu | G08G 1/096775 |
| 2018/0284768 A1 | 10/2018 | Wilkinson et al. | |
| 2019/0079514 A1 | 3/2019 | Zhu | |
| 2019/0278277 A1 | 9/2019 | Tao et al. | |
| 2019/0294167 A1 | 9/2019 | Kutila et al. | |
| 2019/0317508 A1 | 10/2019 | Zhang et al. | |
| 2019/0324475 A1* | 10/2019 | Dean | B60W 60/0011 |
| 2019/0346851 A1 | 11/2019 | Liu et al. | |
| 2020/0098263 A1* | 3/2020 | Yi | G08G 1/005 |
| 2020/0310418 A1* | 10/2020 | Kanoh | B60W 60/0059 |
| 2020/0318981 A1* | 10/2020 | Tyuryutikov | G01C 21/3461 |
| 2021/0253128 A1* | 8/2021 | Nister | B60W 50/0097 |
| 2021/0263524 A1* | 8/2021 | Ackenhausen | G05D 1/0088 |
| 2021/0333112 A1* | 10/2021 | Matsunaga | G01C 21/34 |

FOREIGN PATENT DOCUMENTS

| | | |
|---|---|---|
| DE | 102009027905 A1 | 1/2011 |
| JP | 2017181150 A | 10/2017 |
| JP | 2018185633 A | 11/2018 |
| JP | 2019184493 A | 10/2019 |

\* cited by examiner

Road Connection Table
351

| Start Road Segment 501 | End Road Segment 502 | Start Lane 503 | End Lane 504 |
|---|---|---|---|
| R1 | R2 | A1 | C1 |
| R1 | R2 | A1 | C2 |
| R1 | R2 | A2 | C1 |
| ... | ... | ... | ... |
| R1 | R5 | A1 | C3 |
| R5 | R4 | E | M1 |
| ... | ... | ... | ... |
| R1 | R3 | A1 | D2 |
| ... | ... | ... | ... |

Road/Lane Table 352

| Road Segments 511 | Lanes 512 |
|---|---|
| R1 | A1, A2, A3, B1, B2, B3, C1, C2, C3 |
| R2 | D1, D2 |
| R3 | S1, S2, S3, T1, T2, T3 |
| R4 | M1, M2, N1, N2 |
| R5 | E |
| ... | ... |

FIG. 5B

Lane Connection Table
353

| Lane In | Lane Out | Type |
|---|---|---|
| C3 | E | Turn right |
| E | M1 | Turn right |
| B3 | C3 | Follow |
| ... | ... | ... |

FIG. 5C

| Lane ID ⟋531 | Length ⟋532 | Width ⟋533 | Location ⟋534 | Effective Distance Labels ⟋535 |
|---|---|---|---|---|
| A1 | 1 kilometer | ... | ... | Left Lane, Straight, 4* Stop Sign |
| A2 | ... | ... | ... | ... |
| A3 | ... | ... | ... | ... |
| A2 | ... | ... | ... | ... |
| A3 | ... | ... | ... | ... |
| E | ... | ... | ... | ... |
| ... | | | | |

Lane Table 354

FIG. 5D

| Type/Labels | Effective Distance (Meters) |
|---|---|
| Straight | 0 |
| Left Turn | 80 |
| Right Turn | 20 |
| U-Turn | 100 |
| Change Lane | 50 |
| Traffic Light/Stop Sign | 100 (for each) |
| Stay in Left Lane | 5 (for each 100 meter) |
| Stay in Mid Lane | 0 (for each 100 meter) |
| Stay in Right Lane | 20 (for each 100 meter) |
| Merge Lane | 200 |
| Split Lane | -50 |
| Lane with a Solid Line | -3 (for each 100 meter) |
| Time Delay Cost | 60 (for each minute) |
| Distance Cost | Distance Length |
| ... | ... |

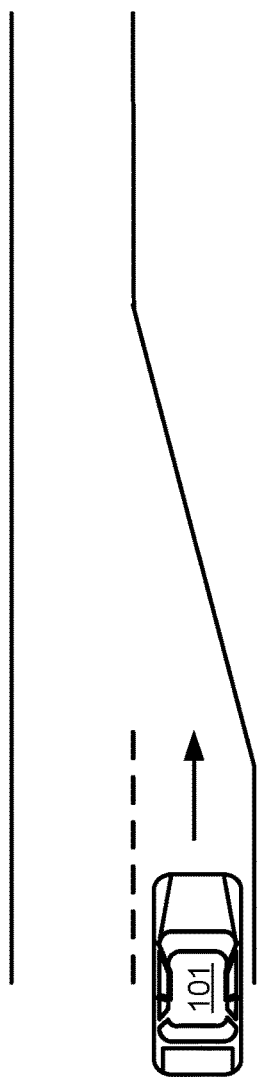 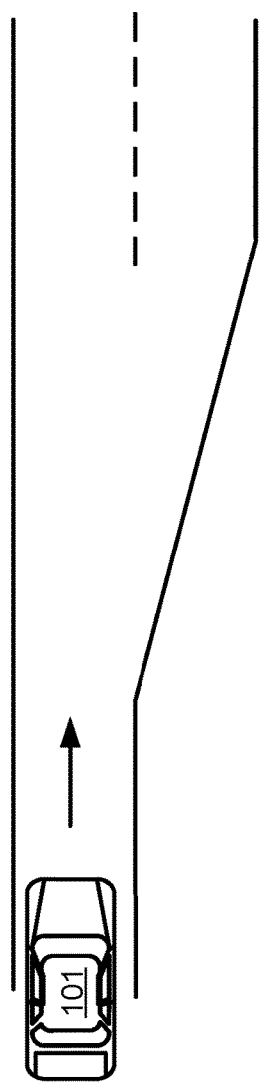 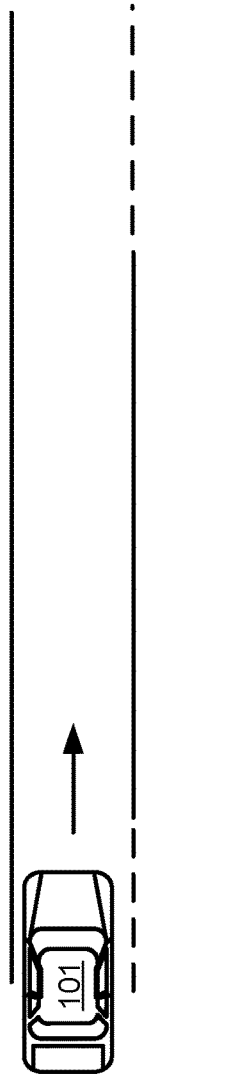
FIG. 6A (Merge Lane)　　FIG. 6B (Split Lane)　　FIG. 6C (Solid Lane Line)

LANE BASED ROUTING SYSTEM FOR AUTONOMOUS DRIVING VEHICLES

TECHNICAL FIELD

Embodiments of the present disclosure relate generally to operating autonomous vehicles. More particularly, embodiments of the disclosure relate to a lane based routing system for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Routing, which is similar to the global positioning system, provides a general level of guidance that indicates general directions for autonomous driving vehicles. Road-based routing lacks efficient and flexibility in searching for an optimal route.

BRIEF DESCRIPTION OF THE DRAWINGS

Embodiments of the disclosure are illustrated by way of example and not limitation in the figures of the accompanying drawings in which like references indicate similar elements.

FIGS. 5A-5E are block diagram illustrating examples of data structures for maintaining road and lane configuration information according to some embodiments.

FIGS. 6A-6C are block diagrams illustrating a merge lane, a split lane, and a solid lane according to some embodiments.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments disclose systems and methods to generate a lane-based reference line for an autonomous driving vehicle. In one embodiment, a system receives a request to route an autonomous driving vehicle (ADV) from a source location to a target location. In response to the request, the system identifies a set of road segments between the source location and the target location navigable by the ADV, where each of the road segments in the set includes one or more lane segments. The system identifies one or more lane paths corresponding to the set of road segments. The system determines an effective distance for each of the one or more lane paths. The system selects a lane path based on the determined effective distance. The system generates a lane-based reference line based on the selected lane path.

Figure 1:
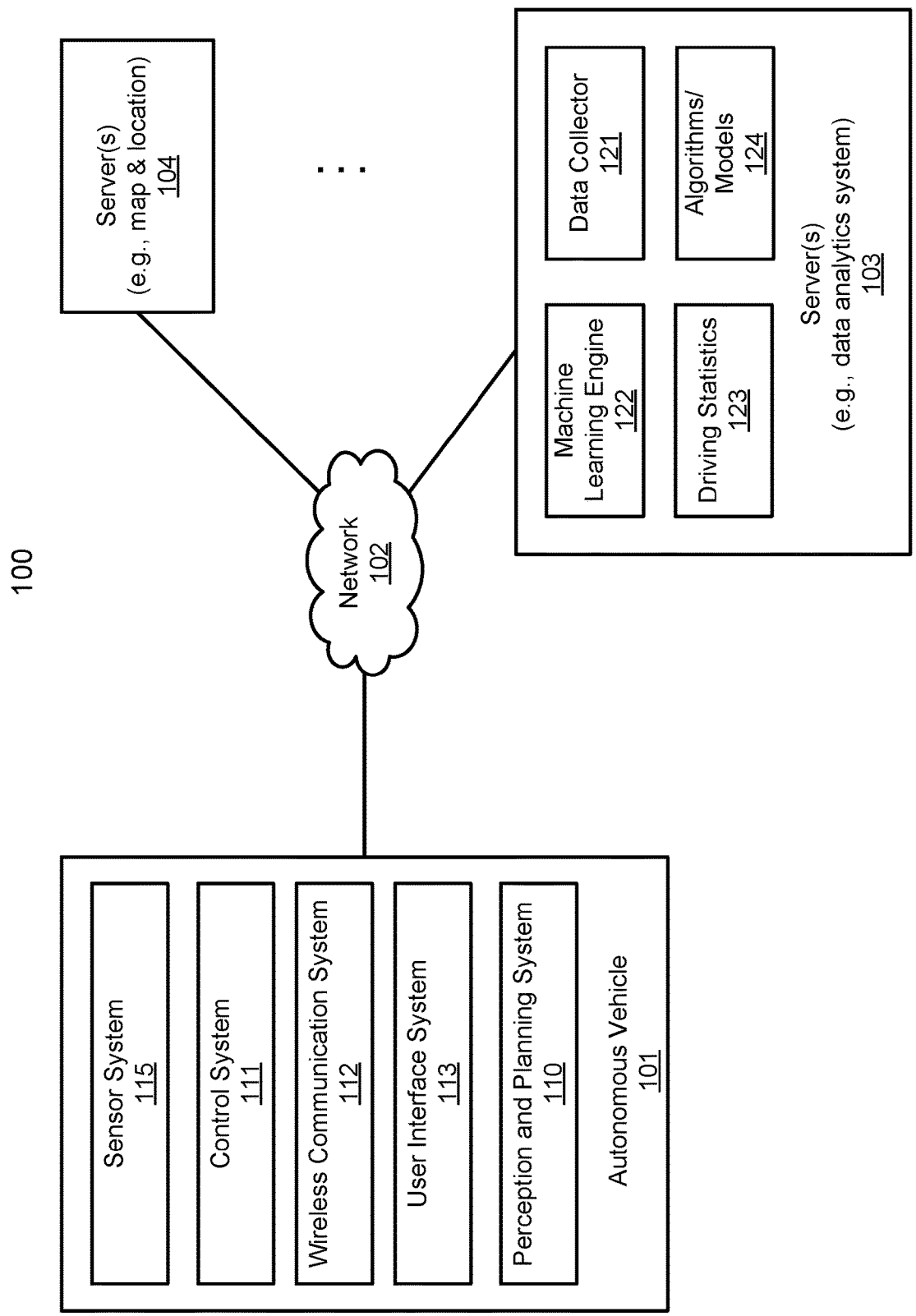
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
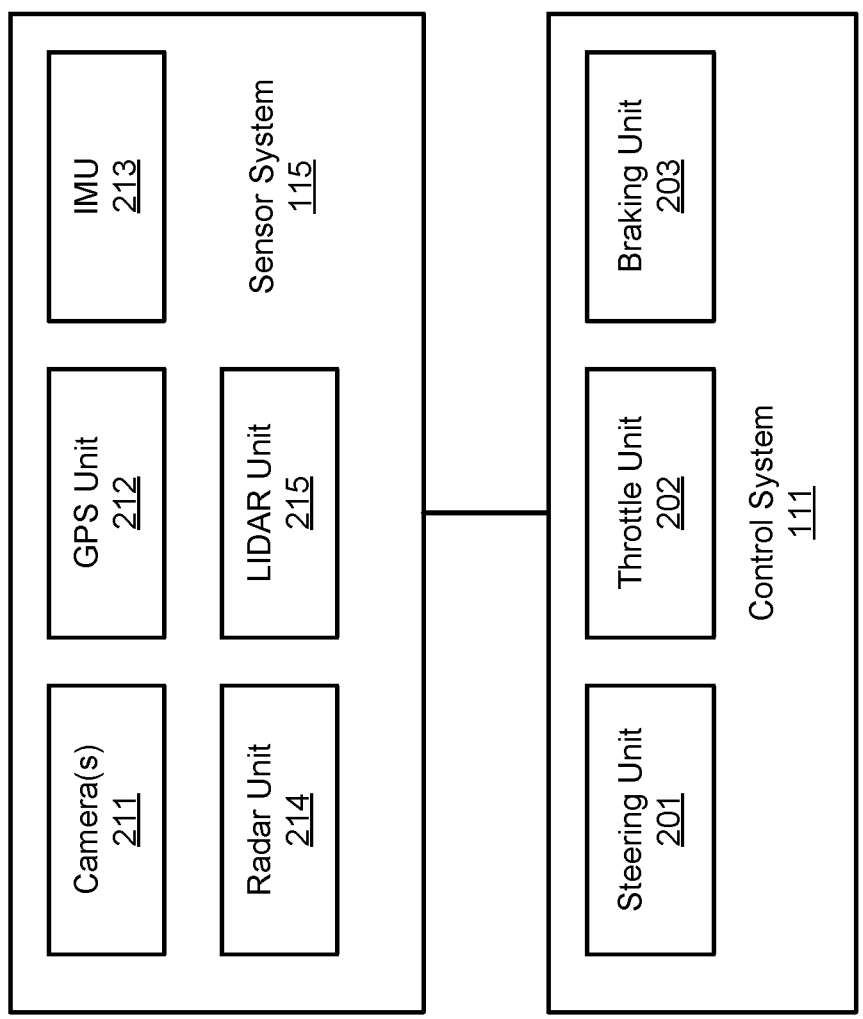
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Such captured commands and vehicle responses can be utilized to interpret or determine driver intentions at different points in time, such as intention to drive straight, turn left or right, change lane, etc. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, machine learning engine 122 generates a set of road-level tables and lane-level tables for routing purposes, collectively referred to as routing tables as a part of rules/models/tables 124. The routing tables may be generated based on route and map information obtained from route and map service providers. In addition, the routing tables may also include roads and/or lanes that have been used by many vehicles, which may or may not be included in the route and map information (e.g., new roads and lanes configuration).

In one embodiment, the routing tables may include a road connection table connecting one road to another road at a road level. The routing tables may include a road/lane mapping table that maps a particular road to a particular lane, or vice versa. The road/lane mapping table is utilized to identify which lane belongs to which road, or which road includes which lanes, etc. The routing tables may further include a lane connection table. The lane connection table includes a number of entries. Each entry representing a lane connection from a first lane to a second lane, which may represent a lane changing point or location (e.g., lane existing and entry points) between the first lane and the second lane. The routing tables may further include a lane table containing information describing each lane, including the length, width, and location or position of the lane. The routing tables may further include an effective distance calculation table containing information describing distance penalties/rewards for a lane and/or driving maneuvers required to enter/exit the lane. The routing tables can then be uploaded to the autonomous driving vehicles to be utilized for reference line generation at real-time.

Figure 3A:
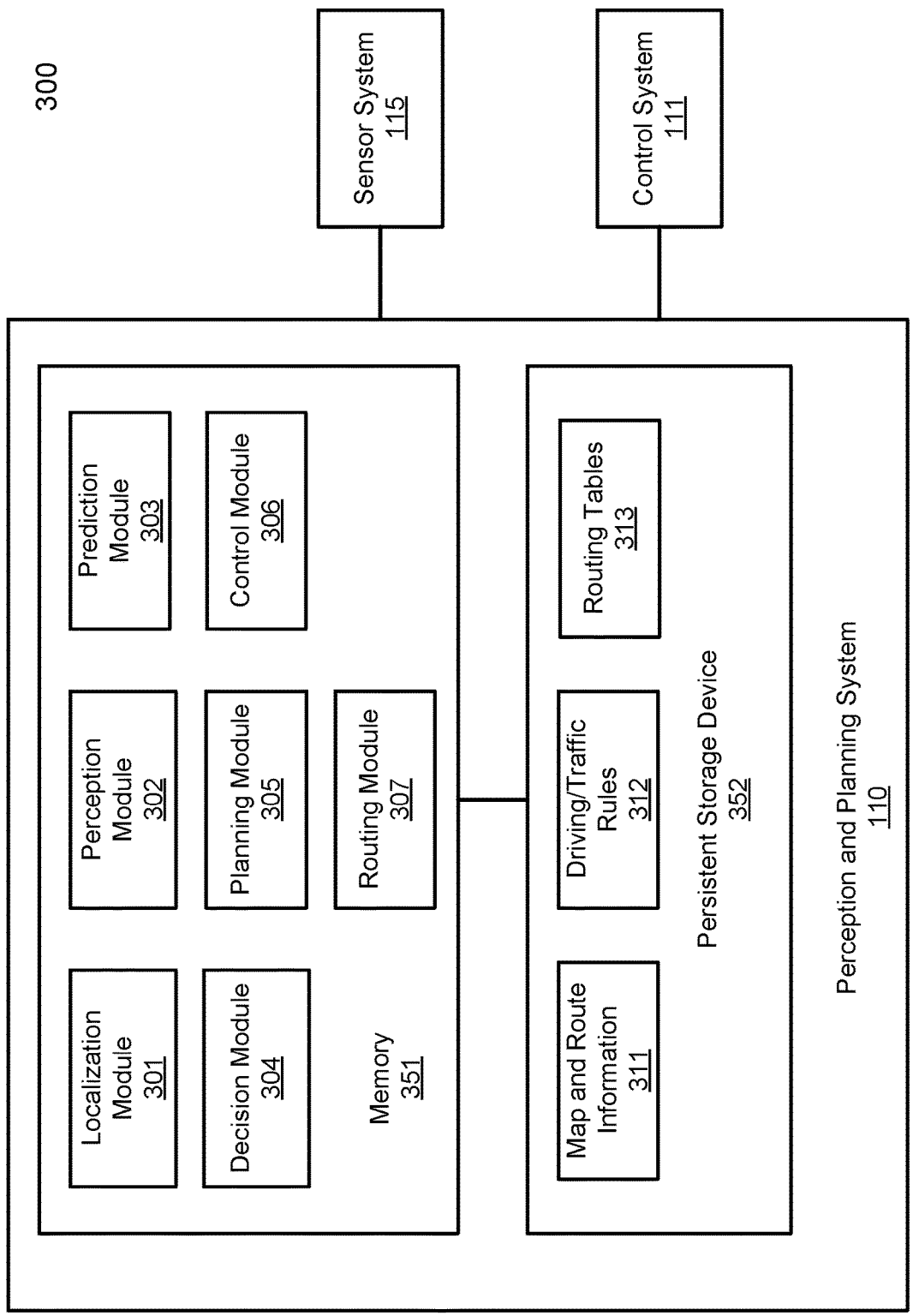
FIGS. 3A-3B are block diagrams illustrating an example of a perception and planning system used with an autonomous vehicle according to one embodiment.
Figure 3B:
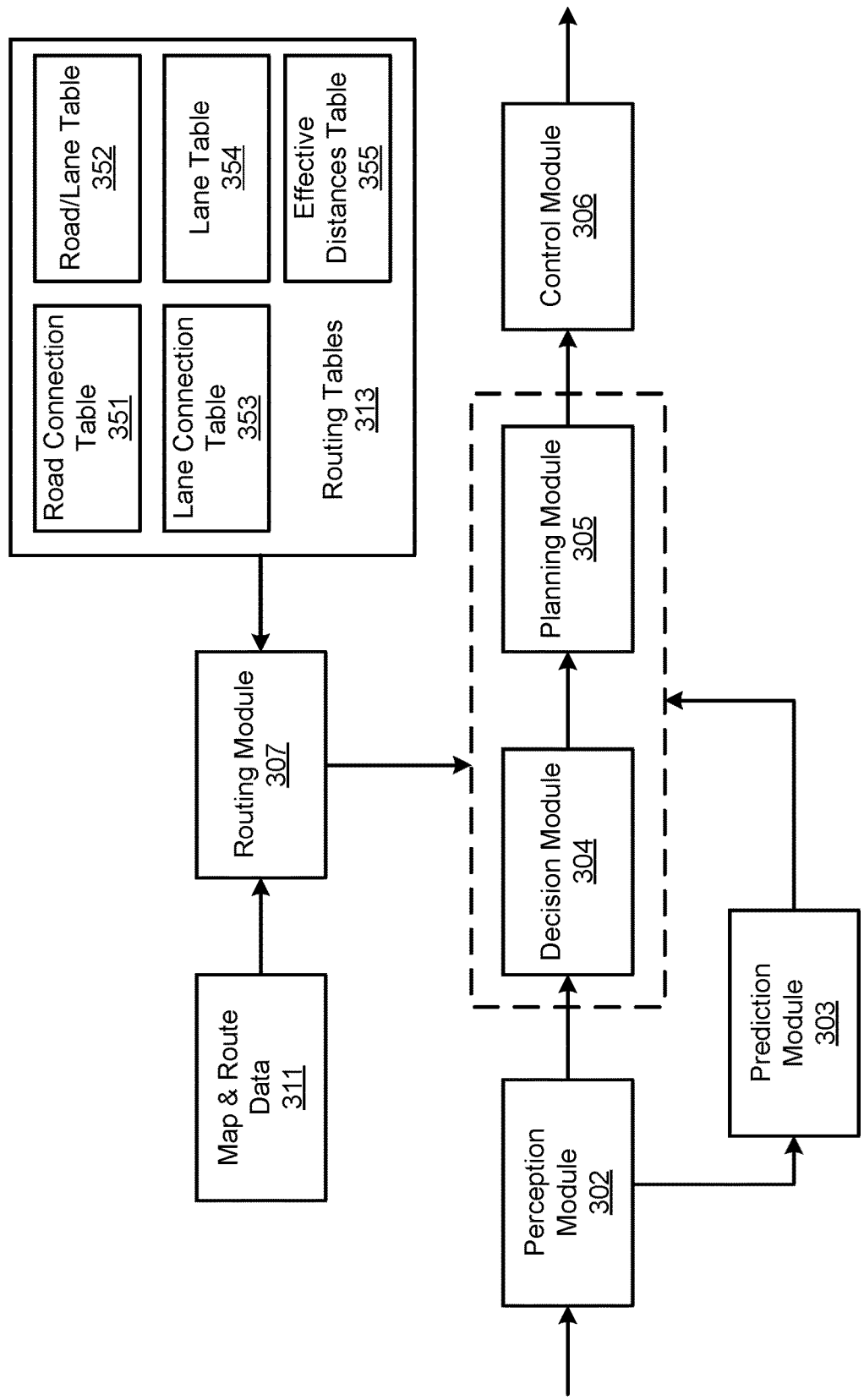

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point, which may represent an entire trip from beginning to the end or a segment of a trip. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 3C:
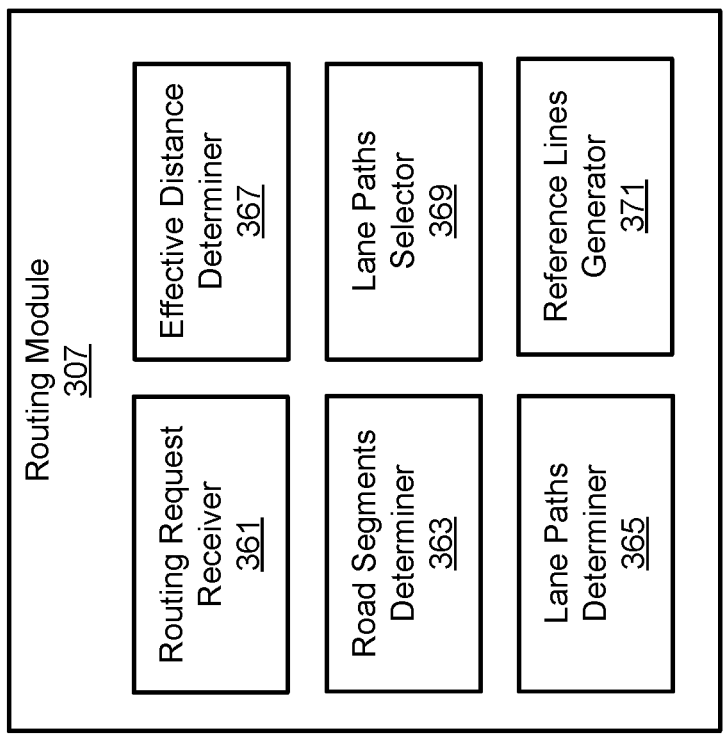
FIG. 3C is a block diagram illustrating an example of a routing module according to one embodiment.

FIG. 3C is a block diagram illustrating an example of a routing module according to one embodiment. Routing module 307 includes routing request receiver 361, road segments determiner 363, lane paths determiner 365, effective distance determiner 367, lane path selector 369, and reference lines generator 371. Routing request receiver 361 can receive a request to generate a path route (a lane path and/or a road path) from a source location to a destination location. Road segments determiner 363 can determine the road segments for a path route. Lane paths determiner 365 can determine (or lists or enumerates) the lane paths for a sequence of road segments. Effective distance determiner 367 can determine an effective distance for a lane path and/or a road path. Lane path selector 369 can select a lane path from a number of lane paths based on a cost minimization function. Reference lines generator 371 can generate a smooth reference line based on a selected lane path and/or a road path.

According to one embodiment, routing module 307 is configured to utilize routing tables 313 (table 313 may be part of map and routing information 311) for reference lines generations. Routing tables 313 may be compiled offline based on route and map information by server 103. Alternatively, the routing tables 313 may be generated dynamically or online based on route and map information 311 of a section of map in which the ADV is driving. In one embodiment, routing tables 313 include a road connection table 351, a road/lane mapping table 352, lane connection table 353, lane table 354, and effective distances table 355, for example, as shown in FIGS. 5A-5E.

In one embodiment, referring to FIG. 5A, road connection table 351 includes a number of road connection entries, where each road connection entry maps or connects a particular road 501 to another road 502. Such a road connection entry indicates that a vehicle can move from a particular road to another particular road, including a starting lane 503 and an ending lane 504 that can reach from a starting road to an ending road. In one embodiment, referring to FIG. 5B, road/lane mapping table 352 includes a number of road/lane mapping entries, where each road/lane mapping entry maps or associates a particular road 511 with one or more lanes 512 of the road, or vice versa. Such a road/lane mapping entry specifies which lane is associated with or belongs to which road.

In one embodiment, referring to FIG. 5C, lane connection table 353 includes a number of lane connection entries, where each lane connection entry maps or connects a particular lane 521 to another particular lane 522, as well as a type of lane connection 523 (e.g., turn left, turn right, go straight). In this example, a lane connection of each entry indicates that a vehicle can reach lane 522 from lane 521 via a driving transaction 523. In one embodiment, referring to FIG. 5D, lane table 354 includes a number of lane entries, each lane entry corresponding to a particular lane 531. Each lane entry stores information describing the corresponding lane including, but is not limited to, a length of the lane 532, a width of the lane 533, a location of the lane 534 (e.g., geographic location or coordinates (x, y) of the center point of the lane, and effective distance labels 535 (e.g., for calculating effective distance for a particular lane). In one embodiment, by matching the lane IDs and their locations, one can determine whether it is feasible to connect one lane to another, either following the current lane vertically or change a lane laterally.

FIG. 5D can also include effective distance labels. For example, lane A1 includes labels "Left Lane, Straight, Stop Sign". Based on these labels, lane characteristics (that can lengthen or shorten an effective lane distance) can be associated to corresponding lanes.

Figure 5E:

In one embodiment, referring to FIG. 5E, effective distances table 355 includes a number of name-value pairs for effective distances labels (or costs) to calculate an effective distance for a particular lane and/or road based on lane/road characteristics and/or types of lane transitions. Some of the effective distance costs/modifiers include, but is not limited to, a penalty of 80 meters for a left turn, 20 meters for a right turn, 100 meters for a u-turn, and 50 meters for a lane change. A lane with a traffic light or a stop sign incurs a 100 meter penalty. Staying in a left lane costs 5 meters for every 100 meter, staying in a right lane costs 20 meters for every 100 meter. A lane that merges with another lane incurs a 200 meter penalty, a lane that splits off into two separate lanes is rewarded a 50 meter reward. Lane with solid lane lines on either side is rewarded with 3 meters for every 100 meter. To take travel speed into consideration, a lane can cost 60 meters for every extra minute to navigate in comparison with an alternate lane. That is, a lane that takes 4 minutes to complete will cost 4*60 meters and an alternate lane that takes 3 minutes to complete will cost 3*60 meters. Here, the effective distance costs can be categorized into traffic assist elements and traffic delay elements. Some of the elements being distance dependent and/or time dependent. Note that the effective distance costs in FIG. 5E are shown for the purpose of illustration and should not be construed as limiting.

In one embodiment, the tables of FIGS. 5A-5E or road and/or lane configurations are configured or defined via a standard route and map service provided by a route and map service provider obtained via a standard application programming interface (API) or communication protocol. In another embodiment, these road and lane configurations are provided by map and route information 311 of FIG. 3A.

According to one embodiment, in response to a routing request from a source location, e.g., a source lane, to a target location, e.g., target lane, routing module 307 searches in road/lane mapping table 352 based on the source road/lane and the target location (e.g., target lane) to identify the source road containing the source lane and a target road containing the target lane. In another embodiment, the source road/target road are identified in the routing request.

In one embodiment, based on the source road and the target road, routing module 307 searches in road connection table 351 to identify one or more road segments that lead from the source road to reach the target road. Each of the road segments includes one or more intermediate lanes. One or more road paths are generated from the source road to the target road at a road level. For each of the road paths, routing module 307 enumerates one or more lane paths based on lane connection table 353, each lane path having a sequence of lanes that connects a source lane to a target lane via one or more intermediate lanes. Routing module 307 then generates an effective distance for each of the lane paths and selects the lane path with a lowest effective distance and generates a path-based reference line based on the selection.

In another embodiment, routing module 307 selects a different set of road segments for the effective distance calculations to generate an alternate lane path. Here, lane-based reference lines may be generated for both the lane path and the alternate lane path. A selection is displayed to a user of the ADV to select one of the two routes. That is, the user can be prompted to select a reference line. E.g., such as a selection for local roads or highway and local roads.

In another embodiment, routing module 307 can automatically select whether to use a road-based reference line or a lane-based reference line based on a predetermined threshold of traffic congestion (e.g., >10% traffic time delay) and/or road conditions. E.g., a road-based reference line is selected for narrow roads with one or two lanes, and a lane-based reference line is selected for wide roadways with three or more lanes.

Figure 4:
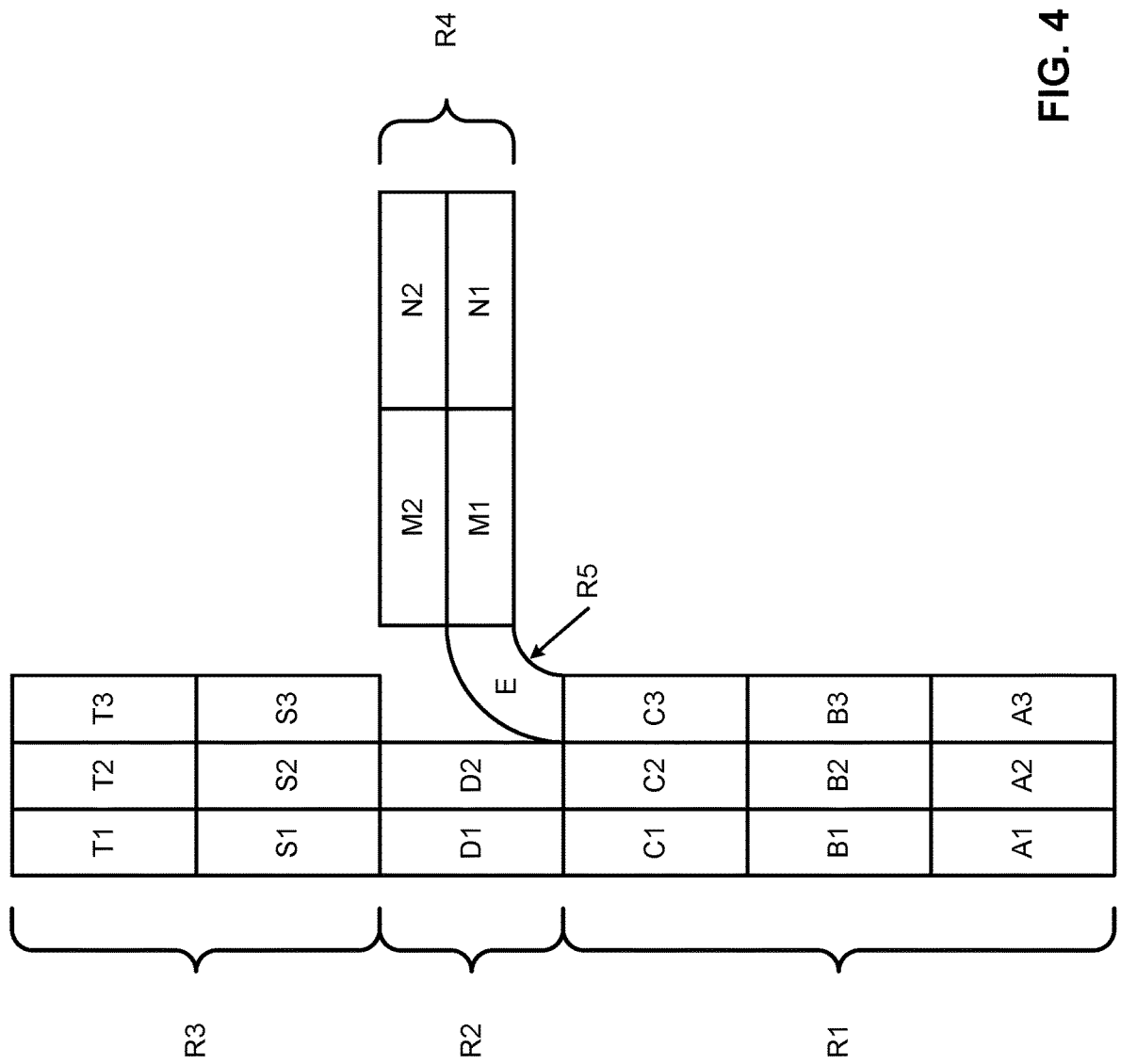
FIG. 4 is a block diagram illustrating an example of road and lane configuration which may be utilized with an embodiment.

In one embodiment, referring to FIG. 4 as an example of a road and/or lane configuration, the configuration includes roads R1, R2, R3, and R4. Each road includes one or more lanes. In this example, road R1 includes lanes A1-A3, B1-B3, and C1-C3. Road R2 includes lanes D1 and D2. Road R3 includes lanes S1-S3 and T1-T3. Road R4 includes lanes M1-M2 and N1-N2. Road R5 includes lane E.

In response to a routing request from source lane A1 to target lane N1, routing module 307 searches in road/lane mapping table 352 as shown in FIG. 5B to identify source road R1 associated with lane A1 and target road R4 associated with N1. In another embodiment, the request includes source road R1 and target road R4. Based on the source road R1 and target road R4, routing module 307 searches in road connection table 351 to identify the road segment(s) and lane(s) that connects source road R1 to target road R4. In this example, from entry 551, road R1 connects to R5 via lane C3. Road R5 connects to road R4 via lane M1 as indicated by entry 552. Thus, in order to reach target road R4 from source road R1, a vehicle has to go through road segment R5. The road connection or road path in this example is R1-R5-R4, which is a road level connection. For each of the roads R1, R4, and R5, routing module 307 searches lane connection table 353 to identify a lane connection between lanes of roads R1 and R5, and between lanes of roads R5 and R4. In this example, the lane connections can be identified as C3-E at entry 553 and E-M1 at entry 554. That means in order to reach road R5 from road R1, the vehicle has to exit road R1 via lane C3 and enter road R5 via lane E. Similarly, the vehicle has to exit road R5 via lane E and enter road R4 via lane M1.

Within road R1, routing module 307 identifies all the possible lane paths from source lane A1 to exiting lane C3: (1) A1-B1-C1-C2-C3, (2) A1-B1-B2-C2-C3, (3) A1-B1-B3-C3, (4) A1-A2-B2-C2-C3, and (5) A1-A2-A3-B3-C3. For road R5, in this example, there is only one lane, i.e., lane E. For road R4, from lane M1 to N1, there is only one lane path: M1-N1. Based on the above lane paths, for each of the lane paths, routing module 307 generates an effective distance based on an effective distance calculation algorithm. The effective distance for each lane path can characterize the effective distance to navigate the lane path taking into account different traffic and road conditions associated with the lane path. Routing module 307 then selects a lane path with a lowest effective distance and generates a lane-based reference line using the selected lane path.

The effective distance for these lane paths can be calculated based on the type of lane transitions and the lane configuration using FIGS. 5C-5E. For example, effective cost for lane path A1-B1-C1-C2-C3 can be calculated as a cumulative sum of the lane transitions (A1-B1), (B1-C1), (C1-C2), and (C2-C3); and the underlying lanes A1, B1, C1, C2, and C3.

Referring to FIG. 4, an example of an effective distance calculation for lane transition (A1-B1) can be: cost (follow) =0; lane transition (C1-C2) can be: cost (lane change)=50. An example for an effective distance calculation for lane A1 may be: cost (distance)+cost (being a left lane)+cost (straight)+cost (stop sign)=1000+(−5)*1000/100+0+ 4*100=1350. Effective distance for a lane path can be calculated by summing the transitions and the underlying lanes. From the effective distance calculations of the enumerated lane paths, a lane path with a lowest effective distance, e.g., lowest cost, can be selected to generate a lane-based reference line.

The lane-based reference line is then provided as an initial trajectory to decision module 304 and/or planning module 305. Decision module 304 and/or planning module 305 can generate trajectories that deviate from the initial trajectory in real-time to maneuver the ADV in view of the perception information (e.g., obstacles, traffic condition) perceived by the ADV.

FIGS. 6A-6C are block diagrams illustrating a merge lane, a split lane, and a solid lane according to some embodiments. The effective distance for a merge lane incurs a penalty cost. The motivating factor is that when two or more lanes merge together, traffic flow tends to congest, or queue up, due to traffic merging from the two or more lanes, incurring a penalty cost. In contract, a split lane and solid lane lines incur a reward cost. Here, the motivating factor is that when a lane splits into two or more lanes, traffic flow tends to be relieved. Similarly, solid lane lines (not the road boundary lines) tend to indicate vehicles are not allowed to change lanes over the solid lane lines, thus, the solid lane lines tend to improve a traffic flow.

Figure 7:
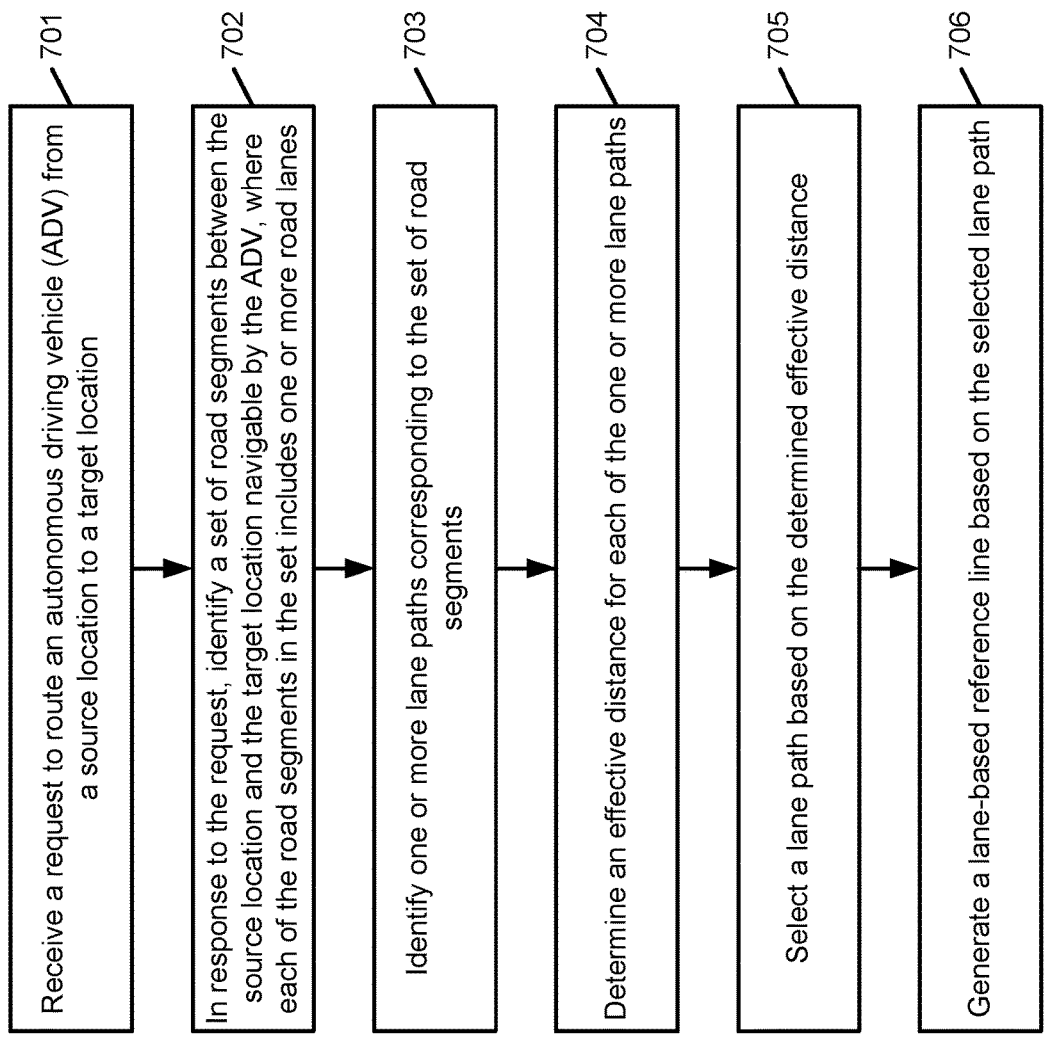
FIG. 7 is a flow diagram illustrating a method for operating an autonomous driving vehicle according to one embodiment.

FIG. 7 is a flow diagram illustrating a process of routing a path for driving an autonomous driving vehicle according to one embodiment. Process 700 may be performed by processing logic which may include software, hardware, or a combination thereof. For example, process 700 may be performed by routing module 307, decision module 304, and/or planning module 305. Referring to FIG. 7, in operation 701, processing logic receives a request to route an autonomous driving vehicle (ADV) from a source location to a target location. In response to the routing request, in operation 702, processing logic identifies a set of road segments between the source location and the target location navigable by the ADV, wherein each of the road segments in the set includes one or more lane segments. In one embodiment, the request identifies the road segments.

In operation 703, processing logic identifies one or more lane paths corresponding to the set of road segments. In operation 704, processing logic determines an effective distance for each of the one or more lane paths. In operation 705, processing logic selects a lane path based on the determined effective distance. In operation 706, processing logic generates a lane-based reference line based on the selected lane path.

In one embodiment, processing logic further plans a trajectory from the source location to the target location based on the generated lane-based reference line in view of obstacles perceived by one or more sensors of the ADV. In one embodiment, processing logic further identifies an alternate set of road segments between the source location and the target location navigable by the ADV; identifies one or more alternate lane paths corresponding to the alternate set of road segments; determines an effective distance for each of the one or more alternate lane paths, generates an alternate lane-based reference line based on the determining; determines a user selection selecting the lane-based reference line or the alternate lane-based reference line having the alternate set of road segments; and plans a trajectory from the source location to the target location based on the user selection.

In one embodiment, processing logic further generates a road-based reference line using the same set of road segments; automatically selects whether to use the lane-based reference line or the road-based reference line based on predetermined traffic or road conditions; and plans a trajectory from the source location to the target location based on the automatic selection.

In one embodiment, the effective distance for lane paths having a traffic assist element is shortened or rewarded corresponding to the traffic assist element. In one embodiment, the effective distance for lane paths having a split lane includes a first predetermined reward distance. In one embodiment, the effective distance for lane paths having a solid lane line indicating lane changes are not allowed includes a second predetermined reward distance.

In one embodiment, the effective distance for lane paths having a traffic delay element is lengthened or penalized corresponding to the traffic delay element. In one embodiment, the effective distance for lane paths having a merge lane includes a first predetermined penalty distance. In one embodiment, the effective distance for lane paths having a left turn, a right turn, a u-turn, or a lane change includes a second, a third, or a fourth predetermined penalty distance, respectively. In one embodiment, the effective distance for lane paths having a traffic delay element is lengthened or penalized corresponding to a length of the lane segment.

In one embodiment, the effective distance includes a fifth predetermined penalty length-based distance cost for staying on a left lane and a sixth predetermined penalty length-based distance cost for staying on a right lane. In one embodiment, the effective distance for lane paths includes a seventh predetermined penalty distance cost based on an estimated length of time to navigate the lane paths, e.g., a time-based distance cost.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV), the method comprising:
   identifying a set of road segments between a source location and a target location navigable by the ADV, wherein each road segment in the set of road segments includes one or more lane segments;
   determining one or more lane paths based on lane segments of the set of road segments;
   determining an effective distance for each lane path of the one or more lane paths in view of a current position of the ADV, wherein the effective distance for the lane path is modified based on whether the lane path has a left turn, a right turn, a U-turn, or a lane change;
   generating a lane-based reference line based on a lane path selected from the one or more lane paths based on the effective distance of the lane path;
   generating a road-based reference line based on the set of road segments without using the effective distance of each lane path of the one or more lane paths;
   automatically selecting a reference line of the lane-based reference line or the road-based reference line based on a number of lanes in each of the set of road segments; and
   planning a trajectory from the source location to the target location based on the selected reference line.

2. The method of claim 1, further comprising:
   identifying an alternate set of road segments between the source location and the target location navigable by the ADV;
   identifying one or more alternate lane paths corresponding to the alternate set of road segments;
   determining an alternative effective distance for each of the one or more alternate lane paths;
   generating an alternate lane-based reference line based on the determined alterative effective distance;
   determining a user selection selecting the lane-based reference line or the alternate lane-based reference line; and
   planning an alternative a trajectory from the source location to the target location based on the user selection.

3. The method of claim 1, wherein the effective distance for each lane path having a traffic assist element is shortened or rewarded corresponding to the traffic assist element.

4. The method of claim 1, wherein the effective distance for each lane path having a split lane includes a first predetermined reward distance.

5. The method of claim 1, wherein the effective distance for each lane path having a solid lane line indicating lane changes are not allowed includes a second predetermined reward distance.

6. The method of claim 1, wherein the effective distance for each lane path having a traffic delay element is lengthened or penalized corresponding to the traffic delay element.

7. The method of claim 6, wherein the effective distance for each lane path having the traffic delay element is lengthened or penalized corresponding to a length of a lane segment.

8. The method of claim 1, wherein the effective distance for each lane path having a merge lane includes a first predetermined penalty distance.

9. The method of claim 1, wherein the effective distance for each lane path having the left turn, the right turn, the U-turn, or a lane change includes a second, a third, or a fourth predetermined penalty distance, respectively.

10. The method of claim 1, wherein the effective distance for each lane path includes a fifth predetermined penalty distance for staying on a left lane and a sixth predetermined penalty distance for staying on a right lane.

11. The method of claim 1, wherein the effective distance for each lane path includes a seventh predetermined penalty distance based on an estimated length of time to navigate the each lane path.

12. A non-transitory machine-readable medium having instructions stored therein, which when executed by a processor of an autonomous driving vehicle (ADV), cause the ADV to perform operations, the operations comprising:
   identifying a set of road segments between a source location and a target location navigable by the ADV, wherein each road segment in the set of road segments includes one or more lane segments;
   determining one or more lane paths based on lane segments of the set of road segments;
   determining an effective distance for each lane path of the one or more lane paths in view of a current position of the ADV, wherein the effective distance for the lane path is modified based on whether the lane path has a left turn, a right turn, a U-turn, or a lane change;
   generating a lane-based reference line based on a lane path selected from the one or more lane paths based on the effective distance of the lane path;
   generating a road-based reference line based on the set of road segments without using the effective distance of each lane path of the one or more lane paths;
   automatically selecting a reference line of the lane-based reference line or the road-based reference line based on a number of lanes in each of the set of road segments; and
   planning a trajectory from the source location to the target location based on the selected reference line.

13. The non-transitory machine-readable medium of claim 12, wherein the operations further comprise:
   identifying an alternate set of road segments between the source location and the target location navigable by the ADV;
   identifying one or more alternate lane paths corresponding to the alternate set of road segments;
   determining an alternative effective distance for each of the one or more alternate lane paths;
   generating an alternate lane-based reference line based on the determined alterative effective distance;
   determining a user selection selecting the lane-based reference line or the alternate lane-based reference line; and
   planning an alternative a trajectory from the source location to the target location based on the user selection.

14. The non-transitory machine-readable medium of claim 12, wherein the effective distance for each lane path having a traffic assist element is shortened or rewarded corresponding to the traffic assist element.

15. The non-transitory machine-readable medium of claim 12, wherein the effective distance for each lane path having a split lane includes a first predetermined reward distance.

16. The non-transitory machine-readable medium of claim 12, wherein the effective distance for each lane path having a solid lane line indicating lane changes are not allowed includes a second predetermined reward distance.

17. The non-transitory machine-readable medium of claim 12, wherein the effective distance for each lane path having a traffic delay element is lengthened or penalized corresponding to the traffic delay element.

18. The non-transitory machine-readable medium of claim 12, wherein the effective distance for each lane path having a merge lane includes a first predetermined penalty distance.

19. A data processing system in an autonomous driving vehicle, comprising:
   a processor; and
   a memory coupled to the processor to store instructions, which when executed by the processor, cause the data processing system to perform operations, the operations including
      identifying a set of road segments between a source location and a target location navigable by the ADV, wherein each road segment in the set of road segments includes one or more lane segments;
      determining one or more lane paths based on lane segments of the set of road segments;
      determining an effective distance for each lane path of the one or more lane paths in view of a current position of the ADV, wherein the effective distance for the lane path is modified based on whether the lane path has a left turn, a right turn, a U-turn, or a lane change;
      generating a lane-based reference line based on a lane path selected from the one or more lane paths based on the effective distance of each lane path of the one or more lane paths;
      generating a road-based reference line based on the set of road segments without using the effective distance of the each lane path;
      automatically selecting a reference line of the lane-based reference line or the road-based reference line based on a number of lanes in each of the set of road segments; and
      planning a trajectory from the source location to the target location based on the selected reference line.

20. The system of claim 19, wherein the operations further comprise:
   identifying an alternate set of road segments between the source location and the target location navigable by the ADV;
   identifying one or more alternate lane paths corresponding to the alternate set of road segments;
   determining an alternative effective distance for each of the one or more alternate lane paths;
   generating an alternate lane-based reference line based on the determined alterative effective distance;
   determining a user selection selecting the lane-based reference line or the alternate lane-based reference line; and
   planning an alternative trajectory from the source location to the target location based on the user selection.

* * * * *